(12) United States Patent
Jain et al.

(10) Patent No.: US 7,555,630 B2
(45) Date of Patent: Jun. 30, 2009

(54) METHOD AND APPARATUS TO PROVIDE EFFICIENT COMMUNICATION BETWEEN MULTI-THREADED PROCESSING ELEMENTS IN A PROCESSOR UNIT

(75) Inventors: Sanjeev Jain, Shresbury, MA (US); Gilbert M. Wolrich, Framingham, MA (US); Mark B. Rosenbluth, Uxbridge, MA (US)

(73) Assignee: Intel Corporation, Santa Clara, CA (US)

( * ) Notice: Subject to any disclaimer, the term of this patent is extended or adjusted under 35 U.S.C. 154(b) by 933 days.

(21) Appl. No.: 11/018,579

(22) Filed: Dec. 21, 2004

(65) Prior Publication Data

US 2006/0155959 A1    Jul. 13, 2006

(51) Int. Cl.
*G06F 15/00*    (2006.01)
*G06F 15/76*    (2006.01)

(52) U.S. Cl. .......................................... 712/10; 712/18
(58) Field of Classification Search .................... 712/10, 712/18
See application file for complete search history.

(56) References Cited

U.S. PATENT DOCUMENTS

| | | | |
|---|---|---|---|
| 4,992,933 A * | 2/1991 | Taylor | 712/22 |
| 5,257,218 A | 10/1993 | Poon | |
| 5,398,244 A | 3/1995 | Mathews et al. | |
| 5,442,576 A | 8/1995 | Gergen et al. | |
| 5,455,599 A | 10/1995 | Cabral et al. | |
| 5,460,349 A | 10/1995 | Campbell et al. | |
| 5,477,383 A | 12/1995 | Jain | |
| 5,581,767 A * | 12/1996 | Katsuki et al. | 712/11 |
| 5,864,822 A | 1/1999 | Baker, III | |
| 5,868,909 A | 2/1999 | Eastlund | |
| 5,890,008 A * | 3/1999 | Panwar et al. | 712/15 |
| 5,911,056 A | 6/1999 | Faget et al. | |
| 5,974,525 A | 10/1999 | Lin et al. | |
| 6,247,116 B1 | 6/2001 | Abdallah et al. | |
| 6,263,426 B1 | 7/2001 | Abdallah et al. | |
| 6,266,648 B1 | 7/2001 | Baker, III | |
| 6,266,769 B1 | 7/2001 | Abdallah et al. | |
| 6,282,554 B1 | 8/2001 | Abdallah et al. | |
| 6,292,815 B1 | 9/2001 | Abdallah et al. | |
| 6,307,789 B1 | 10/2001 | Wolrich et al. | |
| 6,324,624 B1 | 11/2001 | Wolrich et al. | |

(Continued)

FOREIGN PATENT DOCUMENTS

WO    WO-2006069355 A2    6/2006

(Continued)

OTHER PUBLICATIONS

"Intel IXP1200 Network Processor Family—The Foundation of a Total Development Environment for Next-Generation Networks", *Product Brief*, (2001),1-4.

(Continued)

*Primary Examiner*—Eddie P Chan
*Assistant Examiner*—Brian P Johnson
(74) *Attorney, Agent, or Firm*—Daley, Crowley, Mofford & Durkee, LLP

(57) ABSTRACT

A context forwarding bus efficiently communicates control and data between processing elements in a processor unit having a plurality of processing elements. Control and data information is transferred over a first bus from processing element to processing element.

12 Claims, 9 Drawing Sheets

U.S. PATENT DOCUMENTS

| | | |
|---|---|---|
| 6,427,196 B1 | 7/2002 | Adiletta et al. |
| 6,442,697 B1 | 8/2002 | Jain et al. |
| 6,463,072 B1 | 10/2002 | Wolrich et al. |
| 6,469,925 B1 | 10/2002 | Jain |
| 6,480,868 B2 | 11/2002 | Abdallah et al. |
| 6,502,115 B2 | 12/2002 | Thakkar et al. |
| 6,510,075 B2 | 1/2003 | Jain |
| 6,532,509 B1 | 3/2003 | Wolrich et al. |
| 6,549,451 B2 | 4/2003 | Jain |
| 6,560,667 B1 | 5/2003 | Wolrich et al. |
| 6,571,333 B1 | 5/2003 | Jain et al. |
| 6,574,738 B2 | 6/2003 | Jain et al. |
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,606,704 B1 | 8/2003 | Adiletta et al. |
| 6,625,654 B1 | 9/2003 | Wolrich et al. |
| 6,631,430 B1 | 10/2003 | Wolrich et al. |
| 6,631,462 B1 | 10/2003 | Wolrich et al. |
| 6,633,987 B2 | 10/2003 | Jain et al. |
| 6,661,794 B1 | 12/2003 | Wolrich et al. |
| 6,667,920 B2 | 12/2003 | Wolrich et al. |
| 6,668,311 B2 | 12/2003 | Hooper et al. |
| 6,681,300 B2 | 1/2004 | Wolrich et al. |
| 6,687,246 B1 | 2/2004 | Wolrich et al. |
| 6,694,380 B1 | 2/2004 | Wolrich et al. |
| 6,694,397 B2 | 2/2004 | Lackey et al. |
| 6,728,845 B2 | 4/2004 | Adiletta et al. |
| 6,738,068 B2 | 5/2004 | Cohen et al. |
| 6,738,831 B2 | 5/2004 | Wolrich et al. |
| 6,779,084 B2 | 8/2004 | Wolrich et al. |
| 6,782,472 B2 | 8/2004 | Jain et al. |
| 6,792,488 B2 | 9/2004 | Wolrich et al. |
| 6,819,201 B2 | 11/2004 | Jain |
| 6,823,438 B2 | 11/2004 | Hooper et al. |
| 6,829,056 B1 | 12/2004 | Barnes et al. |
| 2001/0051948 A1 | 12/2001 | Srinivasan et al. |
| 2002/0006050 A1 | 1/2002 | Jain |
| 2002/0013861 A1 | 1/2002 | Adiletta et al. |
| 2002/0038403 A1 | 3/2002 | Wolrich et al. |
| 2002/0041520 A1 | 4/2002 | Wolrich et al. |
| 2002/0042150 A1 | 4/2002 | Prestegard et al. |
| 2002/0049603 A1 | 4/2002 | Mehra et al. |
| 2002/0049749 A1 | 4/2002 | Helgeson et al. |
| 2002/0053016 A1 | 5/2002 | Wolrich et al. |
| 2002/0055852 A1 | 5/2002 | Little et al. |
| 2002/0059559 A1 | 5/2002 | Reddy et al. |
| 2002/0069121 A1 | 6/2002 | Jain et al. |
| 2002/0073091 A1 | 6/2002 | Jain et al. |
| 2002/0081714 A1 | 6/2002 | Jain et al. |
| 2002/0085008 A1 | 7/2002 | Jain et al. |
| 2002/0087862 A1 | 7/2002 | Jain et al. |
| 2002/0091710 A1 | 7/2002 | Dunham et al. |
| 2002/0106085 A1 | 8/2002 | Jain et al. |
| 2002/0106845 A1 | 8/2002 | Chao et al. |
| 2002/0107811 A1 | 8/2002 | Jain et al. |
| 2002/0111731 A1 | 8/2002 | Jain et al. |
| 2002/0123749 A1 | 9/2002 | Jain |
| 2002/0126621 A1 | 9/2002 | Johnson et al. |
| 2002/0143665 A1 | 10/2002 | Santos et al. |
| 2002/0144039 A1 | 10/2002 | Lackey et al. |
| 2002/0154610 A1 | 10/2002 | Tiedemann et al. |
| 2002/0161889 A1 | 10/2002 | Gamache et al. |
| 2002/0167834 A1 | 11/2002 | Jain |
| 2002/0167835 A1 | 11/2002 | Jain |
| 2002/0167836 A1 | 11/2002 | Jain |
| 2002/0167837 A1 | 11/2002 | Jain |
| 2002/0167845 A1 | 11/2002 | Jain |
| 2002/0169445 A1 | 11/2002 | Jain et al. |
| 2002/0172210 A1 | 11/2002 | Wolrich et al. |
| 2002/0176290 A1 | 11/2002 | Jain |
| 2002/0178229 A1 | 11/2002 | Sinha et al. |
| 2002/0184352 A1 | 12/2002 | Jain et al. |
| 2002/0186657 A1 | 12/2002 | Jain et al. |
| 2002/0188884 A1 | 12/2002 | Jain et al. |
| 2002/0193118 A1 | 12/2002 | Jain et al. |
| 2002/0194560 A1 | 12/2002 | Jain et al. |
| 2003/0004688 A1 | 1/2003 | Gupta et al. |
| 2003/0004689 A1 | 1/2003 | Gupta et al. |
| 2003/0004720 A1 | 1/2003 | Garudadri et al. |
| 2003/0009699 A1 | 1/2003 | Gupta et al. |
| 2003/0014662 A1 | 1/2003 | Gupta et al. |
| 2003/0018677 A1 | 1/2003 | Mathur et al. |
| 2003/0028578 A1 | 2/2003 | Jain et al. |
| 2003/0041082 A1 | 2/2003 | Dibrino |
| 2003/0041099 A1 | 2/2003 | M.N. et al. |
| 2003/0041216 A1 | 2/2003 | Rosenbluth et al. |
| 2003/0041228 A1 | 2/2003 | Rosenbluth et al. |
| 2003/0046044 A1 | 3/2003 | Jain et al. |
| 2003/0046488 A1 | 3/2003 | Rosenbluth et al. |
| 2003/0051073 A1 | 3/2003 | Mishra et al. |
| 2003/0055829 A1 | 3/2003 | Kambo et al. |
| 2003/0056055 A1 | 3/2003 | Hooper et al. |
| 2003/0063517 A1 | 4/2003 | Jain |
| 2003/0065366 A1 | 4/2003 | Merritt et al. |
| 2003/0065785 A1 | 4/2003 | Jain |
| 2003/0079040 A1 | 4/2003 | Jain et al. |
| 2003/0081582 A1 | 5/2003 | Jain et al. |
| 2003/0101361 A1 | 5/2003 | Jain et al. |
| 2003/0101438 A1 | 5/2003 | Mishra et al. |
| 2003/0105899 A1 | 6/2003 | Rosenbluth et al. |
| 2003/0105901 A1 | 6/2003 | Wolrich et al. |
| 2003/0110166 A1 | 6/2003 | Wolrich et al. |
| 2003/0110322 A1 | 6/2003 | Wolrich et al. |
| 2003/0110458 A1 | 6/2003 | Jain et al. |
| 2003/0115347 A1 | 6/2003 | Wolrich et al. |
| 2003/0115426 A1 | 6/2003 | Rosenbluth et al. |
| 2003/0120473 A1 | 6/2003 | Jain et al. |
| 2003/0131022 A1 | 7/2003 | Wolrich et al. |
| 2003/0131198 A1 | 7/2003 | Wolrich et al. |
| 2003/0135351 A1 | 7/2003 | Wilkinson et al. |
| 2003/0140196 A1 | 7/2003 | Wolrich et al. |
| 2003/0144858 A1 | 7/2003 | Jain et al. |
| 2003/0145155 A1 | 7/2003 | Wolrich et al. |
| 2003/0145159 A1 | 7/2003 | Adiletta et al. |
| 2003/0145173 A1 | 7/2003 | Wilkinson et al. |
| 2003/0147409 A1 | 8/2003 | Wolrich et al. |
| 2003/0150998 A1 | 8/2003 | Shin et al. |
| 2003/0172313 A1 | 9/2003 | Jain et al. |
| 2003/0191866 A1 | 10/2003 | Wolrich et al. |
| 2003/0191988 A1 | 10/2003 | Dalal et al. |
| 2003/0193936 A1 | 10/2003 | Wolrich et al. |
| 2003/0196012 A1 | 10/2003 | Wolrich et al. |
| 2003/0204394 A1 | 10/2003 | Garudadri et al. |
| 2003/0204665 A1 | 10/2003 | Jain et al. |
| 2003/0210574 A1 | 11/2003 | Wolrich et al. |
| 2003/0212619 A1 | 11/2003 | Jain et al. |
| 2003/0212852 A1 | 11/2003 | Wolrich et al. |
| 2003/0219984 A1 | 11/2003 | Ying et al. |
| 2003/0224811 A1 | 12/2003 | Jain et al. |
| 2003/0233494 A1 | 12/2003 | Ghosh et al. |
| 2003/0235189 A1 | 12/2003 | Mathew et al. |
| 2004/0004961 A1 | 1/2004 | Lakshmanamurthy et al. |
| 2004/0004964 A1 | 1/2004 | Lakshmanamurthy et al. |
| 2004/0004970 A1 | 1/2004 | Lakshmanamurthy et al. |
| 2004/0004972 A1 | 1/2004 | Lakshmanamurthy et al. |
| 2004/0006724 A1 | 1/2004 | Lakshmanamurthy et al. |
| 2004/0010791 A1 | 1/2004 | Jain et al. |
| 2004/0012459 A1 | 1/2004 | Jain |
| 2004/0032414 A1 | 2/2004 | Jain et al. |
| 2004/0034743 A1 | 2/2004 | Wolrich et al. |
| 2004/0039424 A1 | 2/2004 | Merritt et al. |
| 2004/0039895 A1 | 2/2004 | Wolrich et al. |
| 2004/0054880 A1 | 3/2004 | Bernstein et al. |

| | | |
|---|---|---|
| 2004/0068614 A1 | 4/2004 | Rosenbluth et al. |
| 2004/0071152 A1 | 4/2004 | Wolrich et al. |
| 2004/0072563 A1 | 4/2004 | Holcman et al. |
| 2004/0073728 A1 | 4/2004 | Wolrich et al. |
| 2004/0073778 A1 | 4/2004 | Adiletta et al. |
| 2004/0073893 A1 | 4/2004 | Rajaram et al. |
| 2004/0078643 A1 | 4/2004 | Ghosh et al. |
| 2004/0081229 A1 | 4/2004 | Narayan et al. |
| 2004/0085901 A1 | 5/2004 | Hooper et al. |
| 2004/0093261 A1 | 5/2004 | Jain et al. |
| 2004/0093571 A1 | 5/2004 | Jain et al. |
| 2004/0098433 A1 | 5/2004 | Narayan et al. |
| 2004/0098496 A1 | 5/2004 | Wolrich et al. |
| 2004/0109369 A1 | 6/2004 | Wolrich et al. |
| 2004/0117239 A1 | 6/2004 | Mittal et al. |
| 2004/0117791 A1 | 6/2004 | Prasad et al. |
| 2004/0120359 A1 | 6/2004 | Frenzel et al. |
| 2004/0136445 A1 | 7/2004 | Olson et al. |
| 2004/0139290 A1 | 7/2004 | Wolrich et al. |
| 2004/0160290 A1 | 8/2004 | Jain et al. |
| 2004/0162083 A1 | 8/2004 | Chen et al. |
| 2004/0162933 A1 | 8/2004 | Adiletta et al. |
| 2004/0185868 A1 | 9/2004 | Jain et al. |
| 2004/0186921 A1 | 9/2004 | Wolrich et al. |
| 2004/0190906 A1 | 9/2004 | Jain |
| 2004/0199887 A1 | 10/2004 | Jain et al. |
| 2004/0203795 A1 | 10/2004 | Brusilovsky et al. |
| 2004/0203991 A1 | 10/2004 | Chen et al. |
| 2004/0205316 A1 | 10/2004 | Hooper et al. |
| 2004/0205569 A1 | 10/2004 | Jain et al. |
| 2004/0213219 A1 | 10/2004 | Lakshmanamurthy et al. |
| 2004/0216102 A1* | 10/2004 | Floyd .......................... 718/100 |
| 2004/0224666 A1 | 11/2004 | Jain et al. |
| 2004/0224667 A1 | 11/2004 | Jain |
| 2004/0225907 A1 | 11/2004 | Jain et al. |
| 2004/0230680 A1 | 11/2004 | Jain et al. |
| 2004/0252686 A1 | 12/2004 | Hooper et al. |
| 2004/0252711 A1 | 12/2004 | Romano et al. |
| 2004/0265707 A1 | 12/2004 | Socha |
| 2005/0010761 A1 | 1/2005 | Remedios et al. |
| 2005/0018601 A1 | 1/2005 | Kalkunte et al. |

FOREIGN PATENT DOCUMENTS

WO    WO-2006069355 A3    6/2006

OTHER PUBLICATIONS

"Intel IXP2400 Network Processor—For OC-48/2.5 Gbps network access and edge applications", *Product Brief*, (2002),1-6.

"Intel IXP2850 Network Processor—High-speed, secure content processing in a single chip", *Product Brief*, (2002),1-6.

\* cited by examiner

METHOD AND APPARATUS TO PROVIDE EFFICIENT COMMUNICATION BETWEEN MULTI-THREADED PROCESSING ELEMENTS IN A PROCESSOR UNIT

CROSS REFERENCE TO RELATED APPLICATIONS

Not Applicable.

STATEMENT REGARDING FEDERALLY SPONSORED RESEARCH

Not Applicable.

BACKGROUND

As is known in the art, data forwarding devices, such as routers, process incoming packets at relatively high lines rates, e.g., OC-192 (10 Gbps). Data forwarding devices can include network processors, such as the multi-core, single die IXP 1200 network processor by Intel Corporation, for example. In network processors having multiple processing elements, header information for a received packet is sent to a processing thread that classifies the packet and modifies the network state according to various algorithms. These algorithms process data structures that are shared by packets in the same flow. However, the shared data structures should be accessed in the packet arrival order. It can be difficult to efficiently transfer control and data to the next thread processing a packet belonging to the same flow. For example, a network processor may include sixteen processing elements that must exchange control and/or data.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
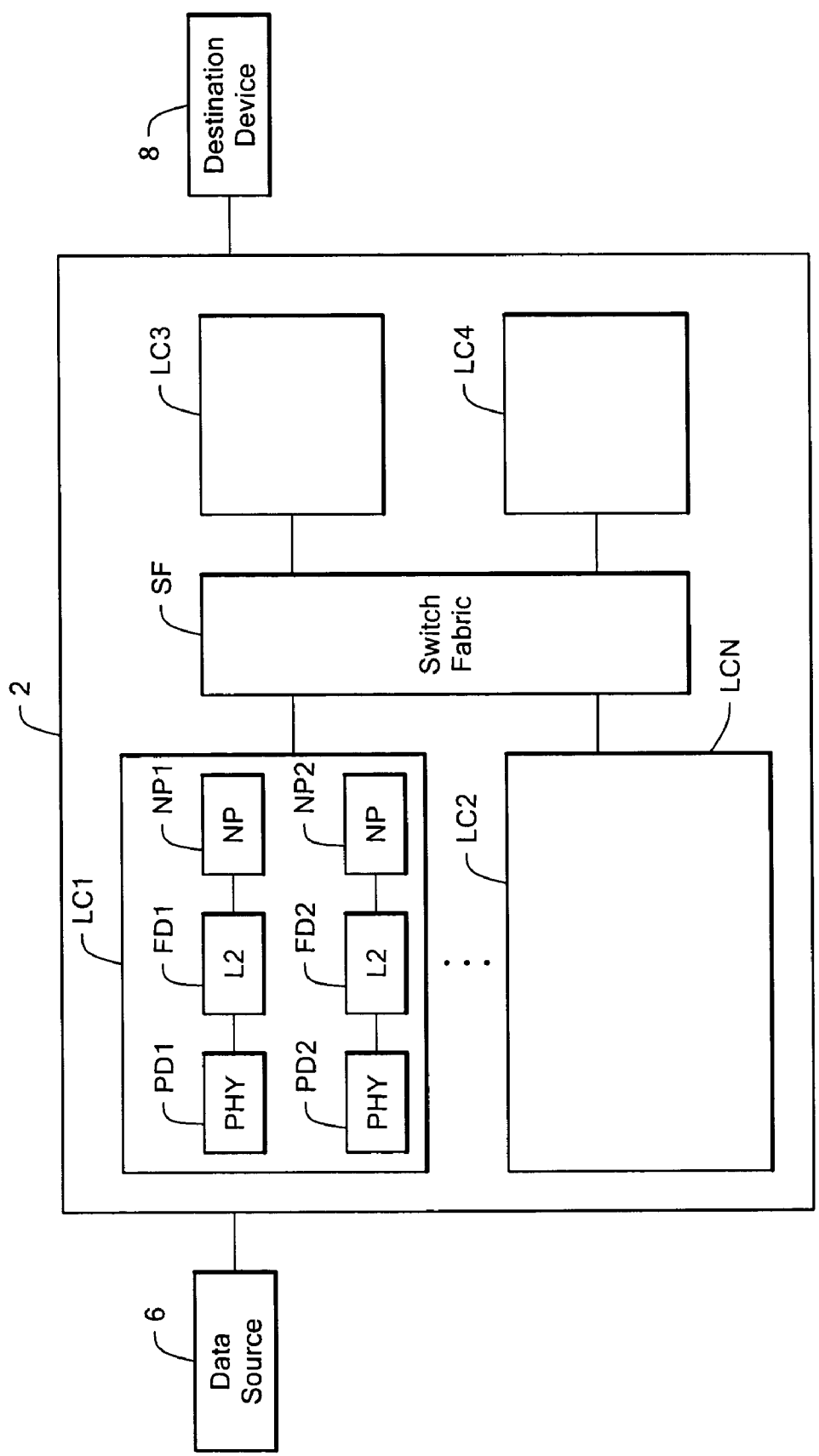
FIG. 1 is a diagram of an exemplary system including a network device having a network processor unit having a context forwarding bus.

FIG. 1 shows an exemplary network device 2 including network processor units (NPUs) having multiple processing elements (PEs) interconnected by a context forwarding bus structure. The NPUs process incoming packets from a data source 6 and transmit the processed data to a destination device 8. The network device 2 can include, for example, a router, a switch, and the like. The data source 6 and destination device 8 can include various network devices now known, or yet to be developed, that can be connected over a communication path, such as an optical path having a OC-192 (10 Gbps) line speed, for example.

The illustrated network device 2 features a collection of line cards LC1-LC4 ("blades") interconnected by a switch fabric SF (e.g., a crossbar or shared memory switch fabric). The switch fabric SF, for example, may conform to CSIX (Common Switch Interface) or other fabric technologies such as HyperTransport, Infiniband, PCI (Peripheral Component Interconnect), Packet-Over-SONET, RapidIO, and/or UTO-PIA (Universal Test and Operations PHY Interface for ATM).

Individual line cards (e.g., LC1) may include one or more physical layer (PHY) devices PD1, PD2 (e.g., optic, wire, and wireless PHYs) that handle communication over network connections. The PHYs PD translate between the physical signals carried by different network mediums and the bits (e.g., "0"-s and "1"-s) used by digital systems. The line cards LC may also include framer devices (e.g., Ethernet, Synchronous Optic Network (SONET), High-Level Data Link (HDLC) framers or other "layer 2" devices) FD1, FD2 that can perform operations on frames such as error detection and/or correction. The line cards LC shown may also include one or more network processors NP1, NP2 that perform packet processing operations for packets received via the PHY(s) and direct the packets, via the switch fabric SF, to a line card LC providing an egress interface to forward the packet. Potentially, the network processor(s) NP may perform "layer 2" duties instead of the framer devices FD.

Figure 2:
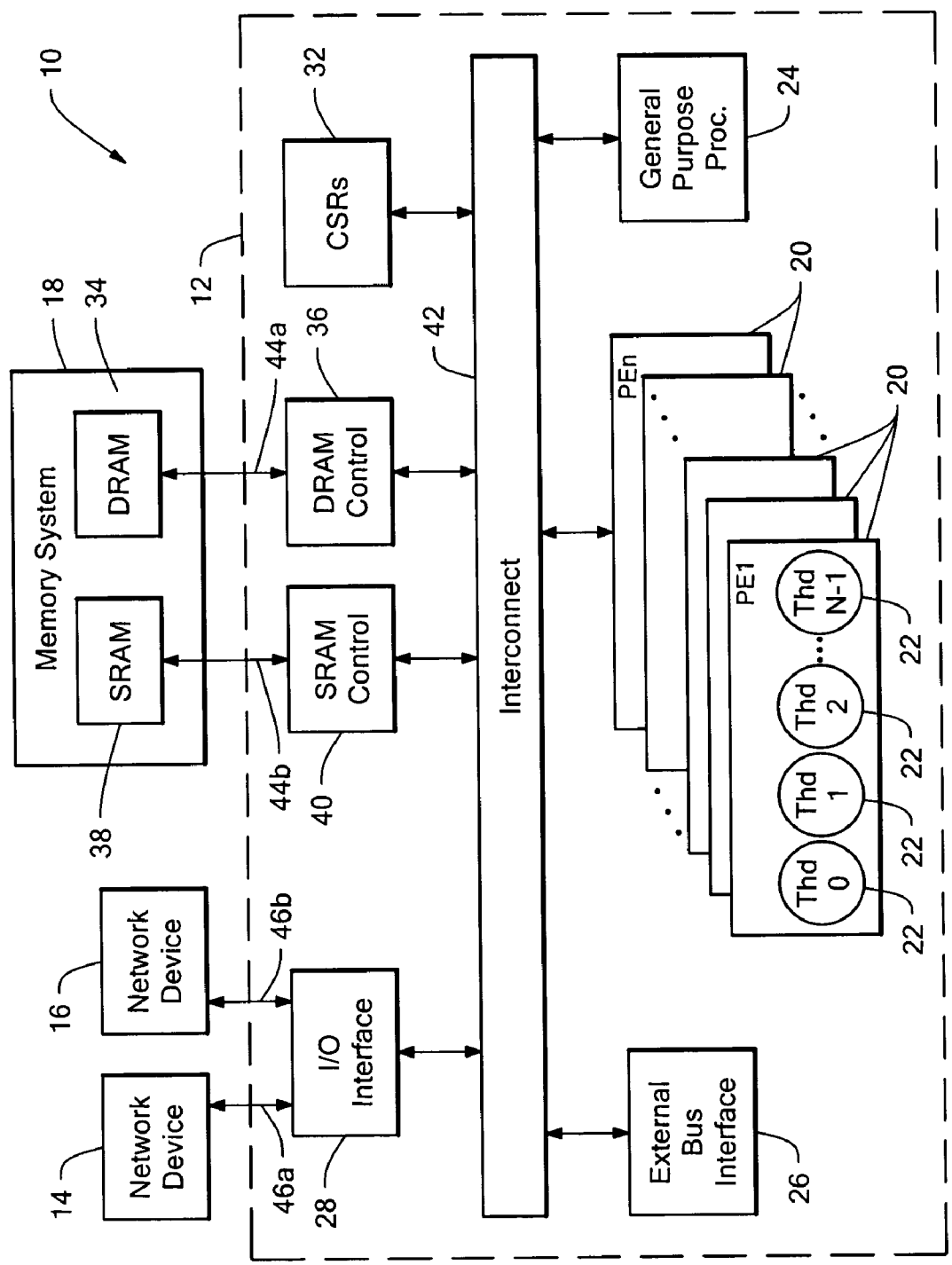
FIG. 2 is a diagram of an exemplary network processor having a context forwarding bus.

FIG. 2 shows an exemplary system 10 including a processor 12, which can be provided as a network processor. The processor 12 is coupled to one or more I/O devices, for example, network devices 14 and 16, as well as a memory system 18. The processor 12 includes multiple processors ("processing elements" or "PEs") 20, each with multiple hardware controlled execution threads 22. In the example shown, there are "n" processing elements 20, and each of the processing elements 20 is capable of processing multiple threads 22. Each of the processing elements 20 is connected to and can communicate with adjacent processing elements. As described in detail below, the PEs 20 can be interconnected with a context forwarding bus (CFB) structure enabling efficient transfer of control and data information among the PEs.

In one embodiment, the processor 12 also includes a general-purpose processor 24 that assists in loading microcode control for the processing elements 20 and other resources of the processor 12, and performs other computer type functions such as handling protocols and exceptions. In network processing applications, the processor 24 can also provide support for higher layer network processing tasks that cannot be handled by the processing elements 20.

The processing elements 20 each operate with shared resources including, for example, the memory system 18, an external bus interface 26, an I/O interface 28 and Control and Status Registers (CSRs) 32. The I/O interface 28 is responsible for controlling and interfacing the processor 12 to the I/O devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, processing of payloads from network packets. In a networking implementation, the SRAM 38 and SRAM controller 40 are used for low latency, fast access tasks, e.g., accessing look-up tables, and so forth.

The devices 14, 16 can be any network devices capable of transmitting and/or receiving network traffic data, such as framing/MAC (Media Access Control) devices, e.g., for connecting to 10/100BaseT Ethernet, Gigabit Ethernet, ATM (Asynchronous Transfer Mode) or other types of networks, or devices for connecting to a switch fabric. For example, in one arrangement, the network device 14 could be an Ethernet MAC device (connected to an Ethernet network, not shown) that transmits data to the processor 12 and device 16 could be a switch fabric device that receives processed data from processor 12 for transmission onto a switch fabric.

In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also be serviced by the processor 12.

In general, as a network processor, the processor 12 can interface to various types of communication devices or interfaces that receive/send data. The processor 12 functioning as a network processor could receive units of information from a network device like network device 14 and process those units in a parallel manner. The unit of information could include an entire network packet (e.g., Ethernet packet) or a portion of such a packet, e.g., a cell such as a Common Switch Interface (or "CSIX") cell or ATM cell, or packet segment. Other units are contemplated as well.

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 3:
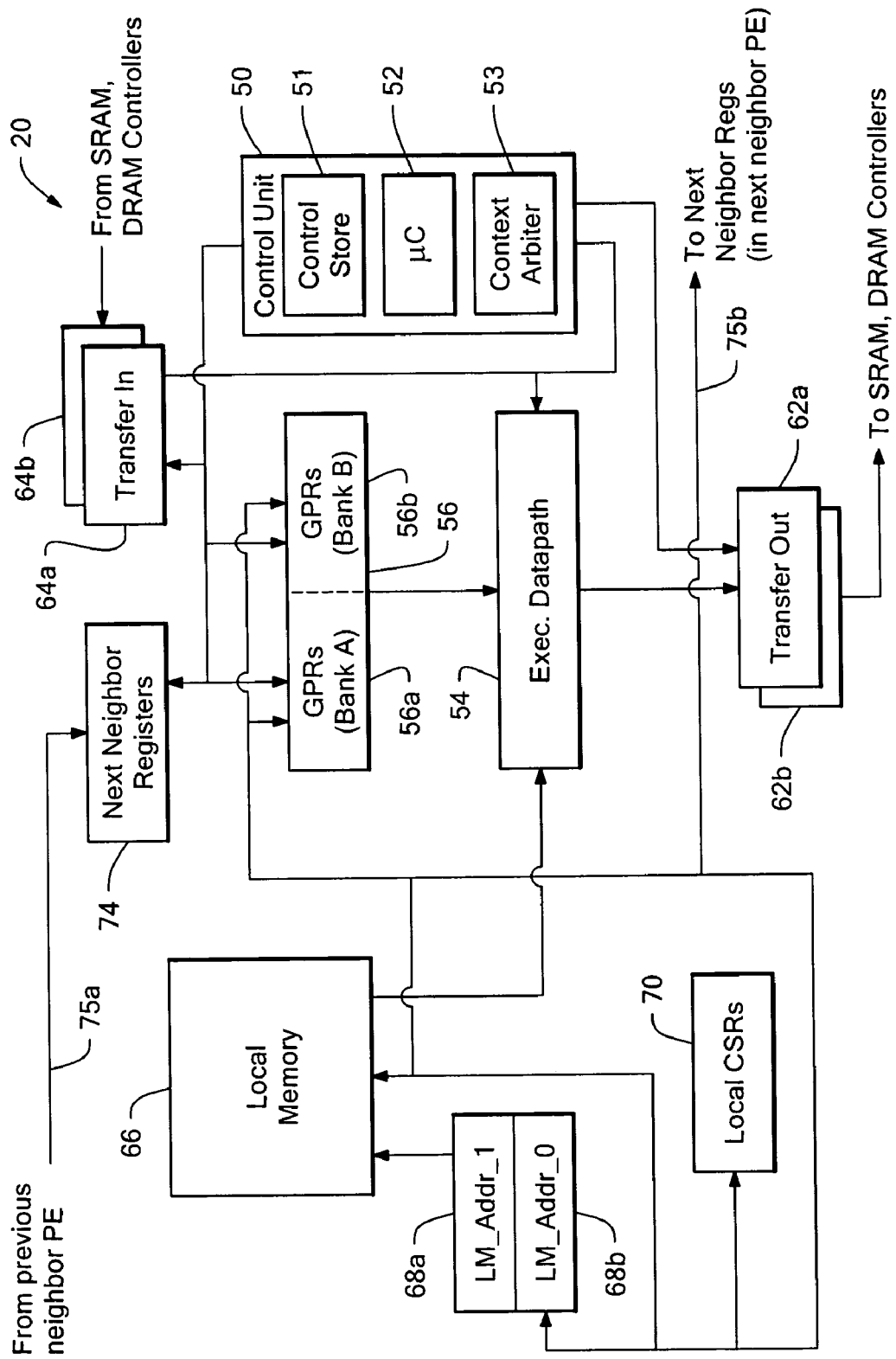
FIG. 3 is a diagram of an exemplary processing element (PE) that runs microcode.

Referring to FIG. 3, an exemplary one of the processing elements 20 is shown. The processing element (PE) 20 includes a control unit 50 that includes a control store 51, control logic (or microcontroller) 52 and a context arbiter/event logic 53. The control store 51 is used to store microcode. The microcode is loadable by the processor 24. The functionality of the PE threads 22 is therefore determined by the microcode loaded via the core processor 24 for a particular user's application into the processing element's control store 51.

The microcontroller 52 includes an instruction decoder and program counter (PC) unit for each of the supported threads. The context arbiter/event logic 53 can receive messages from any of the shared resources, e.g., SRAM 38, DRAM 34, or processor core 24, and so forth. These messages provide information on whether a requested function has been completed.

The PE 20 also includes an execution datapath 54 and a general purpose register (GPR) file unit 56 that is coupled to the control unit 50. The datapath 54 may include a number of different datapath elements, e.g., an ALU (arithmetic logic unit), a multiplier and a Content Addressable Memory (CAM).

The registers of the GPR file unit 56 (GPRs) are provided in two separate banks, bank A 56a and bank B 56b. The GPRs are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The PE 20 further includes a write transfer (transfer out) register file 62 and a read transfer (transfer in) register file 64. The write transfer registers of the write transfer register file 62 store data to be written to a resource external to the processing element. In the illustrated embodiment, the write transfer register file is partitioned into separate register files for SRAM (SRAM write transfer registers 62a) and DRAM (DRAM write transfer registers 62b). The read transfer register file 64 is used for storing return data from a resource external to the processing element 20. Like the write transfer register file, the read transfer register file is divided into separate register files for SRAM and DRAM, register files 64a and 64b, respectively. The transfer register files 62, 64 are connected to the datapath 54, as well as the control store 50. It should be noted that the architecture of the processor 12 supports "reflector" instructions that allow any PE to access the transfer registers of any other PE.

Also included in the PE 20 is a local memory 66. The local memory 66 is addressed by registers 68a ("LM_Addr_1"), 68b ("LM_Addr_0"), which supplies operands to the datapath 54, and receives results from the datapath 54 as a destination.

The PE 20 also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the processing element as well.

Other register types of the PE 20 include next neighbor (NN) registers 74, coupled to the control store 50 and the execution datapath 54, for storing information received from a previous neighbor PE ("upstream PE") in pipeline processing over a next neighbor input signal 76a, or from the same PE, as controlled by information in the local CSRs 70. A next neighbor output signal 76b to a next neighbor PE ("downstream PE") in a processing pipeline can be provided under the control of the local CSRs 70. Thus, a thread on any PE can signal a thread on the next PE via the next neighbor signaling. As described in detail below, the processing elements can be interconnected by a context forwarding bus (CFB) to efficiently transfer data and control information among the PEs.

While illustrative hardware is shown and described herein in some detail, it is understood that the exemplary embodiments shown and described herein for context forwarding bus structures are applicable to a variety of hardware, processors, architectures, devices, development systems/tools and the like.

Figure 4:
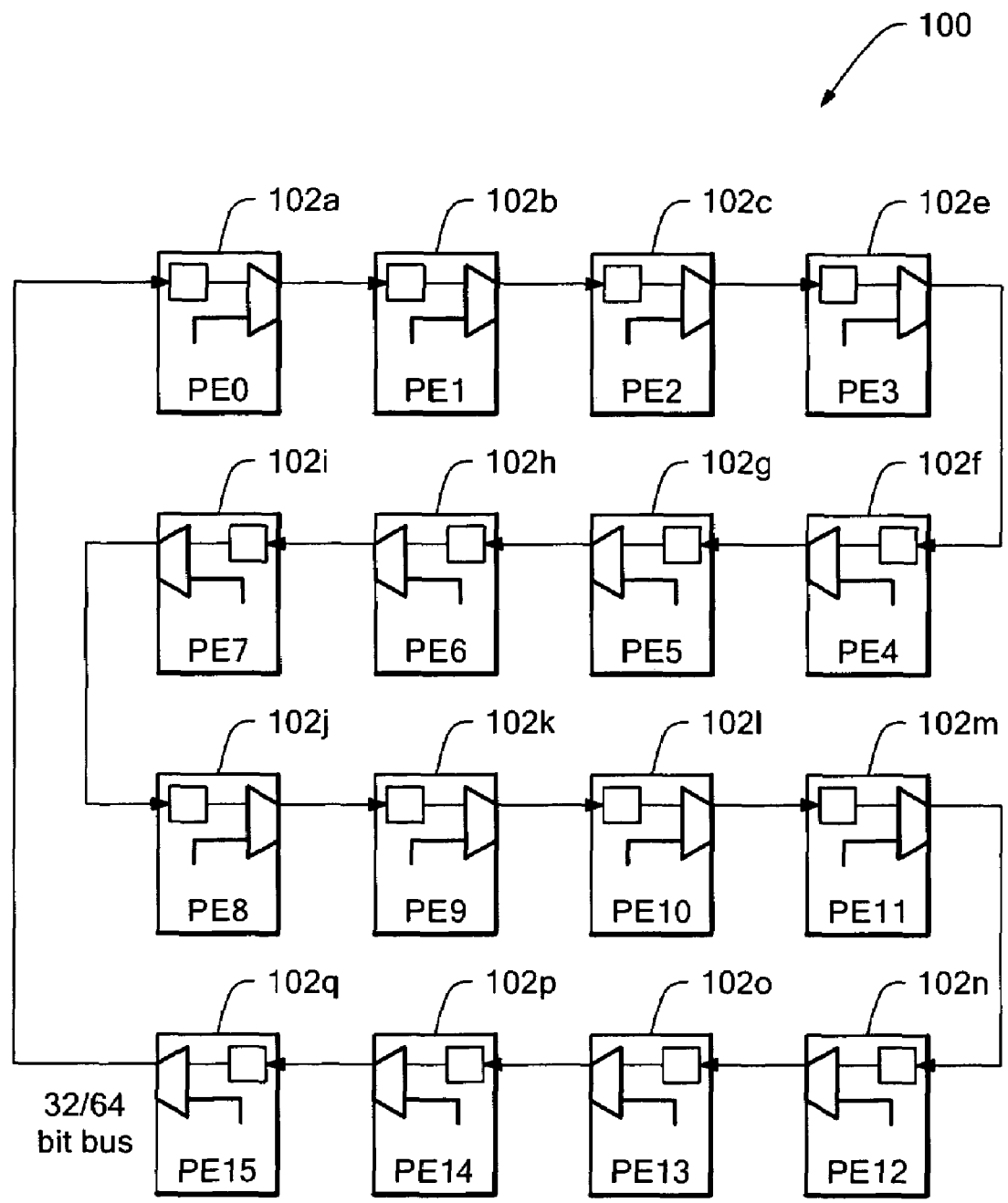
FIG. 4 is a block diagram of a processing unit having a plurality of processing elements coupled with a context forwarding bus.

FIG. 4 shows an exemplary context forwarding bus (CFB) structure 100 interconnecting processing elements 102a-

102q (PE0-PE 15) of a network processing unit in a next neighbor configuration. The sixteenth PE 102o (PE15) is connected to the first PE 102a (PE0). The context forwarding bus (CFB) connects PEs in a ring interconnect structure using next-neighbor connections. Each processing element can have a maximum number, e.g., eight, processing contexts called threads. Since processing requirements vary from packet to packet, it may be difficult to process all packets in time-dependant order. To process back-to-back packets in the same flow, a thread may be required to pass certain dependent variable information to the thread assigned to the next packet for that flow. This next waiting thread may not be 'close', where close means the same or neighboring PE, to the current thread. The CFB structure reduces excessive delays in passing context data between threads, as described in detail below.

While sixteen processing elements are shown, it is understood that any practicable number of processing elements can be used. It is further understood that alternative PE-to-PE interconnection structures will be readily apparent to one of ordinary skill in the art to meet the needs of a particular application. In addition, while the context forwarding bus is primarily shown and described in conjunction with passing context information, it is understood that the context forwarding bus structure can be used to pass any type of data, information, signaling, control, etc, from one processing element to another processing element.

Figure 5:
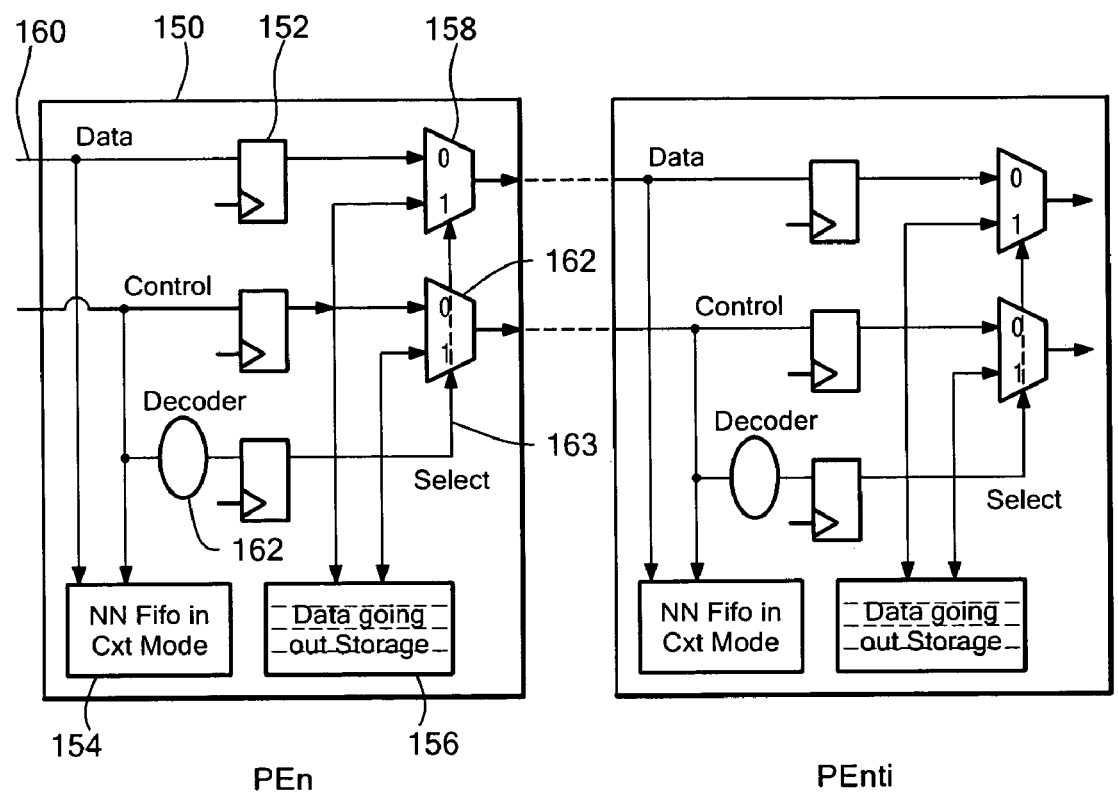
FIG. 5 is a block diagram of an exemplary context forwarding element.

As shown in FIG. 5, each PE 102 includes a CFB circuit 150 having a storage or re-timing element 152, such as a register, that buffers the CFB data. The path from one storage element 152 to the next storage element operates at a predetermined frequency. Each CFB circuit 150 further includes an input storage mechanism 154, such as a FIFO, and an output storage mechanism 156. The input and output storage mechanisms 154, 156 can store data and control information. The output storage mechanism, which can be referred to as "Data Going Out Storage," holds outgoing data until the data is placed on the bus. In an exemplary embodiment, the output storage mechanism 156 holds up to 8 long words (LWs) of data. Before writing the data, the inserting PE/thread should check if enough free space is available in the output storage mechanism 156. If space is available, the data is written. Otherwise the PE/thread waits until space becomes available in the output storage mechanism 156 by polling its status.

Each CFB circuit 150 also includes a data path multiplexer 158 to pass data 160 from the previous PE or from the output storage mechanism 156. Similarly, a control multiplexer 162 passes control information from the previous PE or from the output storage mechanism 156. A decoder 162 determines which path passes through the data and control multiplexers 158, 162 via a mux select signal 163, as described more fully below.

In an exemplary embodiment, the CFB transfer block size is up to two long words (32 bits) for 32-bit mode and up to four long words for 64-bit mode. Both modes use two chassis cycles to transfer the block of data from one processing element to the next in a pipeline fashion.

In one particular embodiment, the CFB structure includes a control bus, which can be 12 bits wide for example, and a data bus, which can be 32 or 64 bits wide, for example. The control bus carries the control information for the data traveling over the data bus. Control information is divided into a first part transmitted in a first part of a cycle and a second part transmitted in the second part of the cycle.

Table 1 defines an illustrative data structure defined for the CFB structure for 32 and 64-bit modes.

TABLE 1

Control and Data bus field description for 32-bit mode and 64-bit mode

| Mode | Name | Field | Description |
|------|------|-------|-------------|
| CFB Data Bus in 32-bit mode | C0 [11:0] | PE Number [4:0] | Target PE number |
| | | Thread Number [7:5] | Target Thread Number |
| | | Number of LW valid [9:8] | Number of LW valid in this block of transfer |
| | | Unused [10] | This bit is not used currently |
| | | Control Valid [11] | A "1" on this location indicates that information in this block transfer is valid. |
| | C1 [11:0] | Transfer Register Number [7:0] | Target Transfer or Next Neighbor register number. |
| | | Signal number [3:0] | Signal number to target PE/Thread to indicate completion of data transfer. |
| | Data0 [31:0] | D0 [31:0] | First LW of the block transfer. This is always valid. {C0 [9:8] == xx} |
| | Data1 [31:0] | D1 [31:0] | Second LW of block transfer. {C0 [9:8] == 01, 10, 11} |
| CFB Data Bus in 64-bit mode | C0 [11:0] | PE Number [4:0] | Target PE number |
| | | Thread Number [7:5] | Target Thread Number |
| | | Number of LW valid [9:8] | Number of LW valid in this block of transfer |
| | | Unused [10] | This bit is not used currently |
| | | Control Valid [11] | A "1" on this location indicates that information in this block transfer is valid. |
| | C1 [11:0] | Transfer Register Number [7:0] | Target Transfer or Next Neighbor register number. |
| | | Signal number [3:0] | Signal number to target PE/Thread to indicate completion of data transfer. |
| | Data0 [31:0] | D0 [31:0] | First LW of the block transfer. This is always valid since at least one LW has to be sent in any transfer. {C0 [9:8] == xx} |
| | Data1 [31:0] | D1 [31:0] | Second LW of block transfer. {C0 [9:8] == 01, 10, 11} |
| | Data2 [31:0] | D3 [31:0] | Third LW of block transfer. {C0 [9:8] == 10, 11} |
| | Data3 [31:0] | D4 [31:0] | Fourth LW of block transfer. {C0 [9:8] == 11} |

Figure 6:
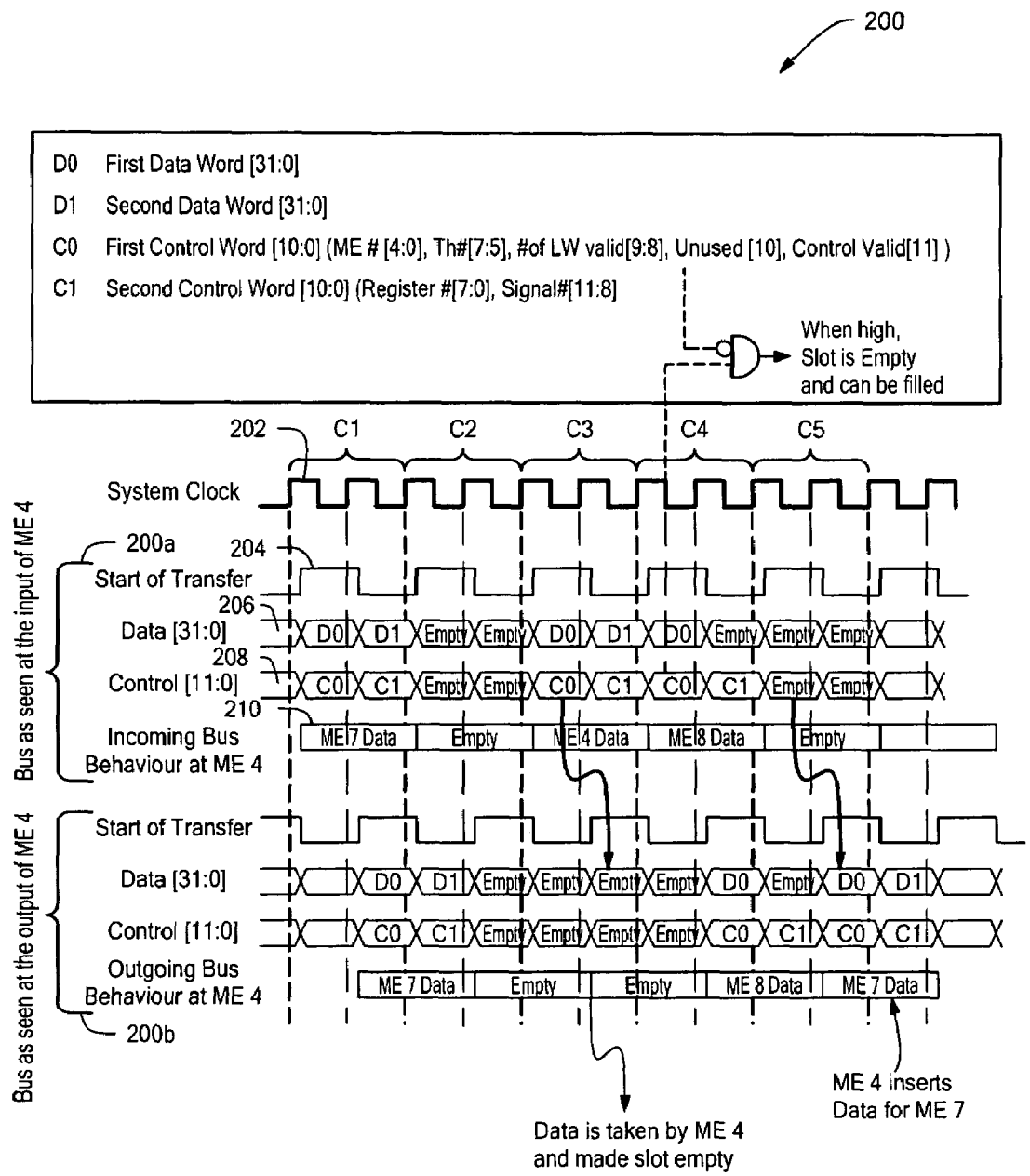
FIG. 6 is a timing diagram showing control and data transfer over a context forwarding bus in 32-bit mode.

FIG. 6 shows an exemplary timing diagram 200 including a timing diagram 200a for the CFB at the input of the fourth PE 102d (FIG. 4), which can be referred to as PE4, and a timing diagram 200b for the CFB at the output of PE4. Operation is shown for 32-bit mode.

Before describing the timing diagram 200 in detail, it is noted that understanding the operation of the CFB can be facilitated by division into three categories:

1. When the CFB element works like a buffer (re-timing element) for the data already on the bus.
2. When a CFB element pulls the data from the bus destined for it.
3. When a CFB element inserts a new data on the bus after sensing an empty slot.

A system clock 202 controls overall timing of PE interaction and a start of transfer (SOT) 204 signal indicates the start of data on the data bus 206 and control information on the control bus 208. For illustrative purposes, bus behavior information 210 identifies the PE of interest for the current transfer cycle.

In cycle one C1 of the incoming timing diagram 200a, first and second data words D0, D1 and first and second controls words C0, C1 for PE7 are received by PE4. For the second cycle C2, the CFB is empty as no control or data words are present on the bus. In the third cycle C3, data words D0, D1 and control words C0, C1 for PE4 are present on the CFB. As can be seen in the output timing diagram 200b, PE4 takes the data and control words D0, D1, C0, C1 off the bus and renders these slots empty and available for use.

In the fourth cycle C4, data and control words D0, C0, C1 for PE8 are passed along the CFB to PE5, which is the next neighbor PE to PE4. In the fifth cycle C5, PE4 inserts data and control words D0, D1, C0, C1 for PE7 onto the CFB. PE7 will take these data and controls words off the bus upon receipt. As can be seen, the CFB is empty at the input of PE4 beginning of C5, enabling PE4 to insert data onto the CFB for a downstream PE.

Figure 6A:
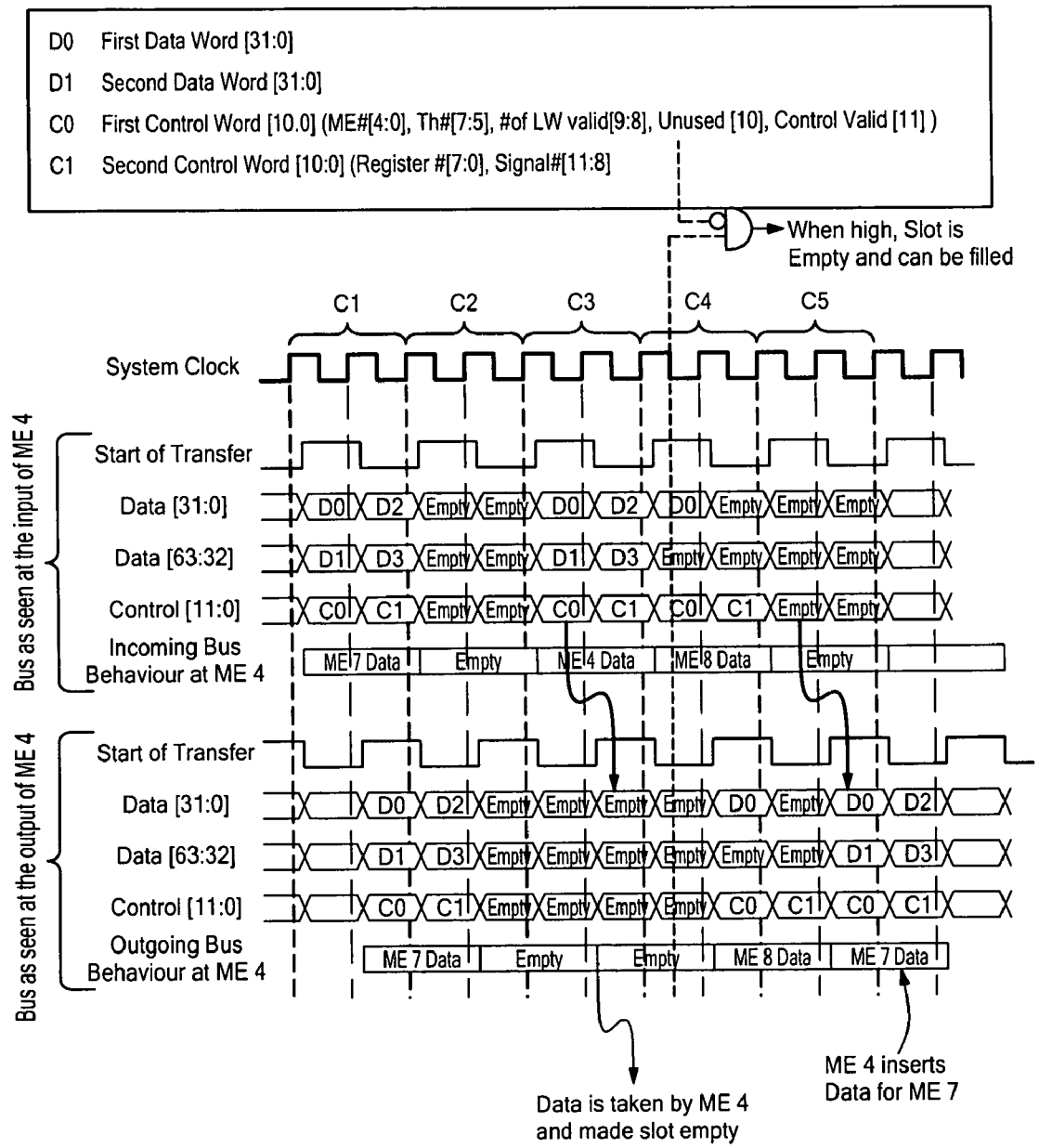
FIG. 6A is a timing diagram showing control and data transfer over a context forwarding bus in 64-bit mode.

FIG. 6A shows a timing diagram 200' for 64-bit mode. As can be readily seen, there is substantial similarity with the timing diagram 200 of FIG. 6. For the sake of brevity, a description of redundant/obvious features in FIG. 6A in view of FIG. 6 is not made. In 64-bit mode, first, second, third, and fourth data words D0, D1, D2, D3 are placed on the bus. The first data word D0 is placed on bits [31:0] of the data bus while the second data word D1 is placed on bits [63:32] of the data bus in parallel. The third data word D2 is placed on bits [31:0] of the data bus after the first word and the fourth data word D4 is placed on bits [63:32] of the data bus after the second word.

Referring again to FIG. 5 in conjunction with FIG. 6, the various CFB operations can be described in further detail. As described above, for the first cycle C1, the CFB element 150 can provide a buffer (re-timing element) for the data already on the bus. The decoder 162 decodes the control information, e.g., control word [11:0] and "Start-Of-Transfer" (SOT). When SOT is "1" and C0 [11] is "1", there is valid data on the CFB. If the data is not for this PE, decoder 162 output generates a logical "0" value for the mux select signal 163 so that the data/control information already on the bus will pass through the multiplexers 158, 162 to the next PE. If the decoder 162 decodes the slot to be empty, e.g., SOT=1 and C0 [11]=0, the mux select 163 signal is a logical "1" and the PE inserts, if any are present, valid data and control words. If the PE does not have any valid data to transfer, it inserts C0 [11]=0 again on to the bus, thereby propagating the empty slot.

As shown in the third cycle C3, a PE can pull data from the CFB destined for that PE. When the decoder 162 decodes SOT=1 and C0 [11]=1, the data on the bus is valid. It compares the PE number with its own number and determines whether there is a match. If so, the data block on the bus is for this PE. The data is pulled in and written at the location defined by the thread number and register number. If a signal for this event is defined, the signal is also sent for the thread. Since the data is taken off the bus, the slot becomes empty and the decoder 162 generates a mux select signal 163 of "1" for the slot. If the PE has valid data to transfer on the CFB bus, it inserts the data/control words along with C0 [11] as "1". If the PE does not have any valid data to transfer, it writes C0 [11] as "0" thereby marking the slot as empty.

As shown in the fifth cycle C5, a CFB element can insert data on the CFB after sensing an empty slot. When the decoder 162 sets the mux select signal 163 to "1", the PE can insert new data on to the bus. To place the data on the bus, the control words C0, C1 are generated in accordance with Table 1 and written in respective empty slots on the bus. Along with the control words C0, C1, the associated data is written onto the data bus. C0 [9:8] defines the number of LWs (long words) valid in the block as is shown in Table 1. If the bus is in 64-bit mode, data words D0 and D1 are inserted into D0 [31:0] and D1 [63:32] in the first part of the cycle and D2 and D3 are written into D0 [31:0] and D1 [63:32] in the second part of the cycle.

It can be readily seen that for a 16-element configuration, the distance between PE0 and PE15 is minimum of 15 chassis clock cycles. Similarly, the distance between PE1 and PE0 is minimum of 15 clock cycles since the CFB bus propagates the data only in the forward direction. However, maximum clock cycle transfers should be minimal since a thread assignment module can assign successive packets to threads that are close to each other in the CFB architecture. For example, looking at FIG. 4, PE3 is close to PE2, but PE1 is not close since CFB propagates the data in forward direction only. Since on average most of the successive threads (threads that have successive packets) are relatively close (within couple of chassis cycles), the above defined bus architecture can efficiently move data between waiting PEs. Therefore, OC-192 performance, or performance close to OC-192, can be achieved in a so-called pool-of-threads programming model.

Figure 7:
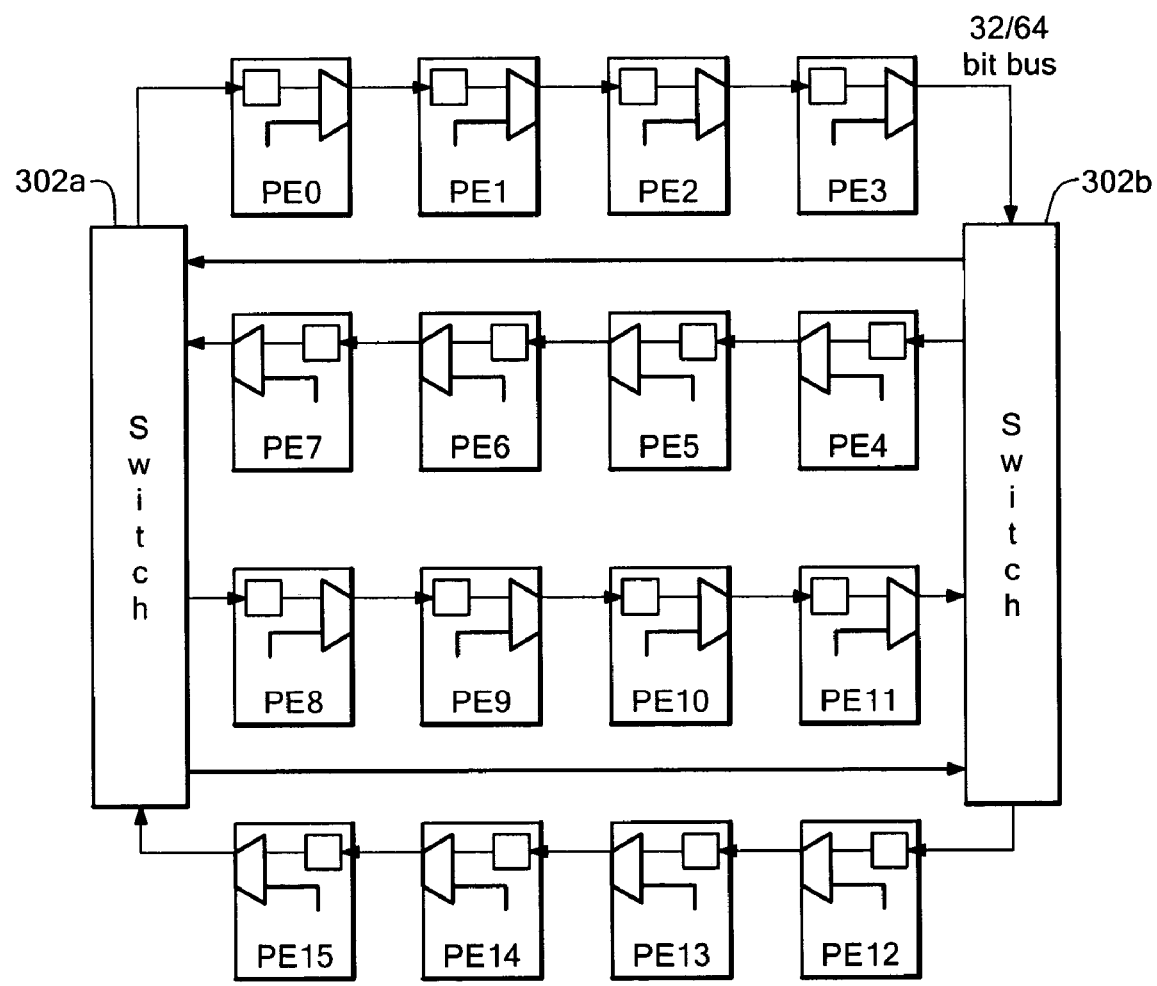
FIG. 7 is a block diagram of a processing unit having a plurality of processing elements coupled with a context forwarding bus having a switch.

In another embodiment shown in FIG. 7, a CFB switch having first and second modules 302a, 302b can be added to the configuration of FIG. 4 to reduce the maximum delay described above by one-half. In addition to the PE-to-PE path, the switch 300 enables certain groups of PEs to be bypassed. For example, data from PE0 can pass through each of PE1, PE2, PE3, to the second switch module 302b and then to PE12, PE13, PE14 and its destination PE15. PE4-11 are bypassed to reduce the maximum delay from 15 to about 7 chassis cycles.

Figure 8:
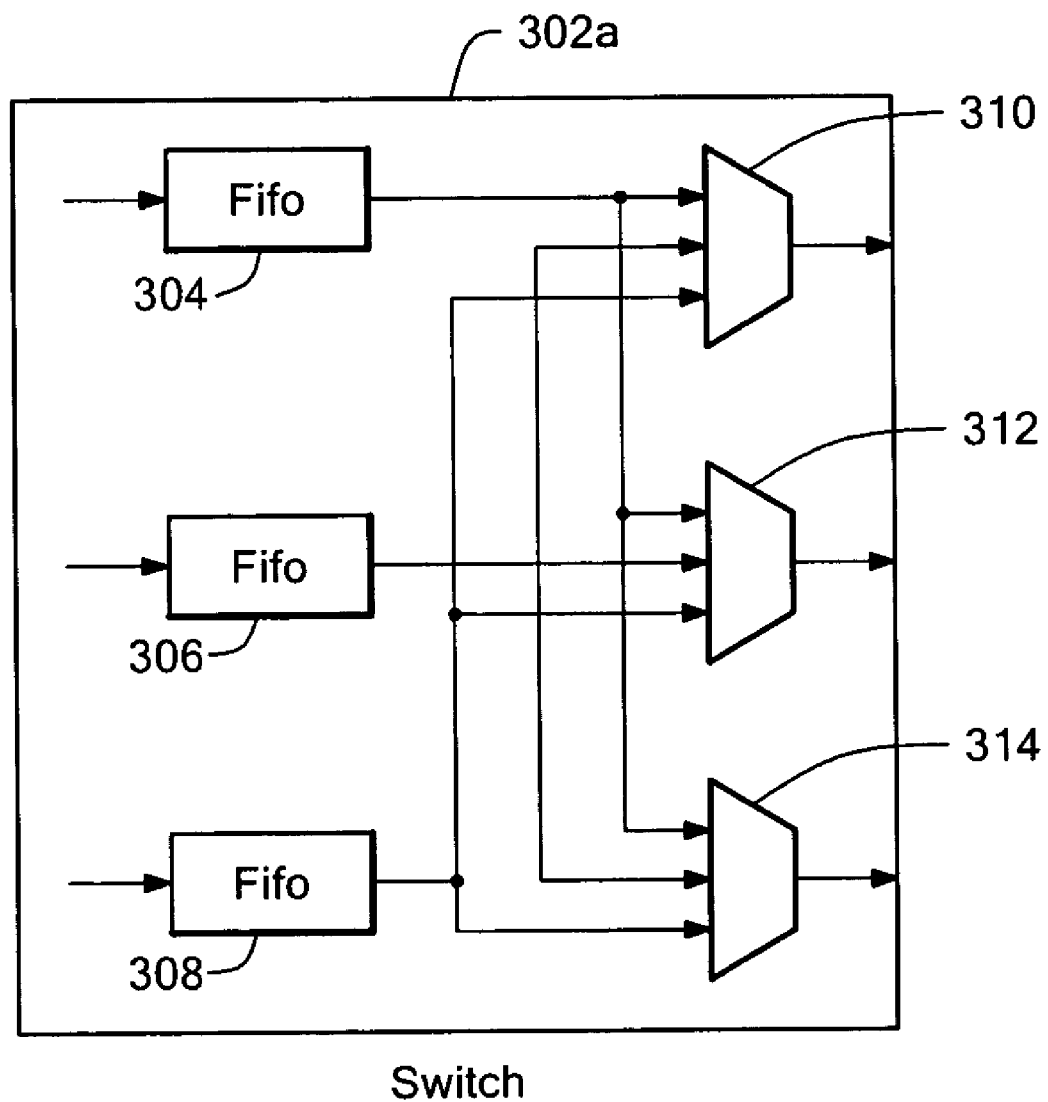
FIG. 8 is a block diagram of an exemplary implementation of the context forwarding bus switch.

FIG. 8, in combination with FIG. 7, shows an exemplary embodiment for the second switch module 302b. The switch module 302b includes a first storage mechanism 304, such as a FIFO, receiving a first input from PE3, for example, a second storage mechanism 306, such as a FIFO, receiving data from the other switch module 302a, and a third storage mechanism 308, such as a FIFO, receiving data from PE11, for example. Each FIFO 304, 306, 308 provides an input to each of first, second, and third multiplexers 310, 312, 314. The first multiplexer 310 can be coupled to the first switch module 302a, the second multiplexer 312 can be coupled to PE4, and the third multiplexer 314 can be coupled to PE12. The first and second switch modules 302a,b can have the same or different configurations.

With this arrangement, the second switch module 302b can provide a path from PE3 to PE4 (the same as if there was no switch module 302 as in FIG. 4), from PE3 to the first switch module 302a, from PE3 to PE12, and from PE11 to PE12 (same as FIG. 4). Control of the multiplexers can be readily determined by one of ordinary skill in the art.

The exemplary embodiments described herein provide a context forwarding bus interconnecting multiple processing elements in a processing unit, which can be formed on a single die and have multiple cores on the die, to enable efficient transfer of control and data information among the processing elements. With this arrangement, inter-thread communication among the processing elements is achieved to support relatively fast line rates, such as OC-192.

What is claimed is:

1. A processing unit, comprising:
   a first multi-threaded processing element configured to process more than one thread; and
   a second multi-threaded processing element configured to process more than one thread coupled to the first processing element by a first bus to enable passing of context data between threads in packet processing, the first bus comprising a control information bus to transfer control information and a data information bus to transfer data information, the second processing element comprising a first circuit to:
receive control information and data information for the second processing element from the first bus,
insert control information and data information for the first processing element onto an available slot on the first bus, and
send on the first bus control information and data information for other processing elements connected to the first bus;
wherein the control information comprises:
information for a target processing element,
a target thread number,
a number of words for transfer,
a next neighbor register number, and
a signal number to target processing element to indicate transfer complete.

2. The unit according to claim 1, wherein the first circuit comprises a first input storage mechanism to store control information and data information for the second processing element from the first bus.

3. The unit according to claim 2, wherein the first circuit further comprises:
an output storage mechanism to store control information and data information to be placed on the first bus by the second processing element; and
a first multiplexer to receive data information from the output storage mechanism.

4. The unit according to claim 3, wherein the first circuit further comprises a data storage element to store data information not for use by the second processing element to be passed along on the first bus;
wherein the first multiplexer is also configured to receive data information from the data storage element.

5. The unit according to claim 1, wherein the processing unit is formed on a single die.

6. The unit according to claim 1, wherein the first processing element, the second processing element and the other processing elements are serially connected in a chain configuration.

7. The unit according to claim 1, wherein the data information bus includes first and second buses to transmit data information in parallel.

8. A method, comprising:
transferring data information and control information among multi-threaded processing elements in a processing unit using a first bus to enable passing of context data between threads in packet processing, each processing element configured to process more than one thread, the transferring comprising:
receiving control information and data information on a first bus having a control bus and a data bus interconnecting the processing elements;
taking control information and data information off the first bus by a target processing element;
passing control information and data information along the first bus by a non-target processing element; and
inserting control information and data information onto the first bus for transmission to another processing element,
wherein the control information comprises:
information for a target processing element,
a target thread number,
a number of words for transfer,
a next neighbor register number, and
a signal number to target processing element to indicate transfer complete.

9. The method according to claim 8, wherein each of the processing elements comprises a first circuit having an input storage mechanism to hold control information and data information taken off the first bus.

10. The method according to claim 9, wherein the first circuit further comprises:
an output storage mechanism to hold control and data information to be inserted on the first bus;
a first multiplexer to receive data information from the output storage mechanism;
a second multiplexer configure to receive control information from the output storage mechanism; and
a decoder configured to provide a select signal to the first and second multiplexers to control the path of the control information and the data information.

11. The method according to claim 10, wherein the first circuit further comprises a data storage element to store data information to be passed along on the first bus,
wherein the first multiplexer is also configured to receive data information from the data storage element.

12. The unit of claim 3, wherein the first circuit further comprises:
a second multiplexer configured to receive control information from the output storage mechanism; and
a decoder configured to provide a select signal to the first and second multiplexers to control the path of the control information and the data information.

* * * * *